Patented May 12, 1925.

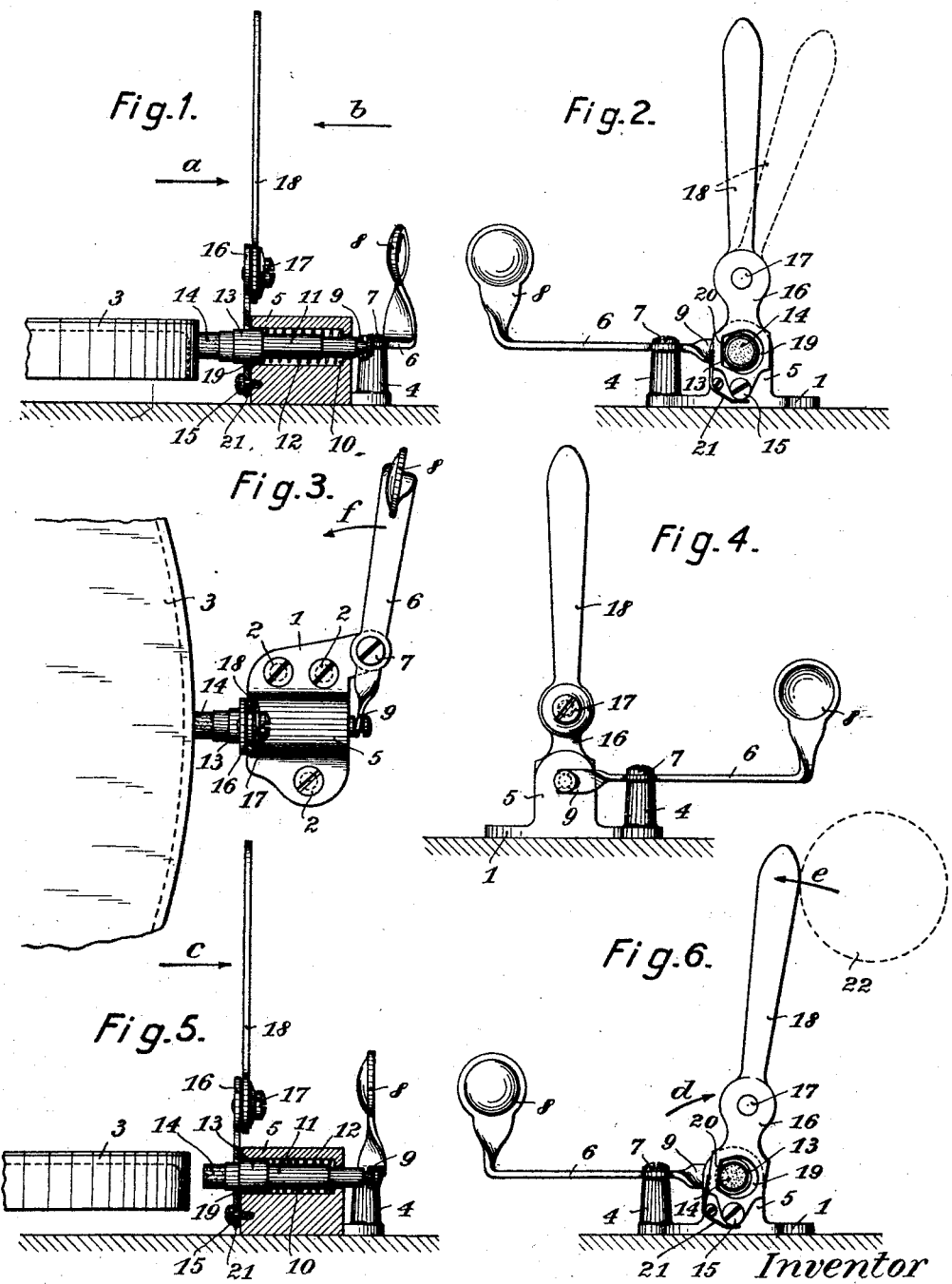

1,537,323

UNITED STATES PATENT OFFICE.

WILLY RIES, OF BERLIN, GERMANY, ASSIGNOR TO N. V. MACHINA MAATSCHAPPIJ VOOR HANDEL EN INDUSTRIE, OF AMSTERDAM, NETHERLANDS.

AUTOMATIC STOP FOR PHONOGRAPHS.

Application filed December 3, 1923. Serial No. 678,087.

*To all whom it may concern:*

Be it known that WILLY RIES, a citizen of the German Republic, residing at Berlin, Germany, has invented certain new and useful Improvements in Automatic Stops for Phonographs, of which the following is a specification.

My invention relates to a new and improved automatic stop for phonographs.

One of the objects of my invention is to provide an automatic stop or brake for the turn table of a phonograph so that the turn table is automatically braked and stopped when the tone-arm of the phonograph is in the desired position, that is when the record has been completely played.

Another object of my invention is to provide a device of this type in which the friction member will be of a type that wears down uniformly so that the action of the device will be reliable.

Another object of my invention is to provide a device of this character in which the brake or friction member will contact with the lateral face of the turn table.

Another object of my invention is to provide a device of this character in which the friction member is preferably of a cylindrical contour and is moved in a direction parallel to its axis.

Other objects of my invention will be set forth in the following description and drawings which illustrate a preferred embodiment thereof.

Fig. 1 is an elevation partially in section and showing the device in the operative position.

Fig. 2 is a side view of Fig. 1 and it is taken in the direction of the arrow *a*.

Fig. 3 is a top view of Fig. 1.

Fig. 4 is a side view of Fig. 1 and it is taken in the direction of the arrow *b*.

Fig. 5 is a view similar to Fig. 1 showing the device in its inoperative position.

Fig. 6 is a side view of Fig. 5 and is taken in the direction of the arrow *c*.

A base plate 1 can be connected by means of screws 2 to any suitable part of the phonograph adjacent the turn table 3. The plate 1 has the vertical bearing 4 and the horizontal bearing 5.

The lever 6 is revolubly mounted on the vertical bearing 4 by means of the screw 7. One branch of the lever 6 has the finger hold 8 and the other end of the lever 6 terminates in a fork 9.

A bolt 11 which may be called the brake bolt is slidably mounted in the recess 10 of the bearing 5, and both ends of the bolt 11 project out of the bearing 5. I prefer to make the bolt 11 of a cylindrical contour.

A spiral compression spring 12 has one end thereof abutting an enlargement 13 of the bolt 11, which is adjacent the turn table 3. The other end of the compression spring 12 abuts the corresponding end of the recess 10 so that the bolt 11 is normally urged towards the turn table 3.

A brake member 14 which is made of rubber, leather or any other suitable friction material is removably mounted in a suitable socket provided at the inner end of the bolt 11. I prefer to make the brake member 14 of a cylindrical contour.

The outer end of the bolt 11 has a suitable recess so that this end of the bolt 11 can be engaged by the fork 9 of the adjusting lever 6.

The inner lateral face of the bearing 5 has a lever 16 revolubly connected thereto by a pin 15. The lever 16 has an extension 18 connected thereto by means of a screw 17 so that the extension 18 can be adjusted with respect to the lever 16, as shown in dotted lines in Fig. 2. However, the frictional contact between the lever 16 and the extension 18 is sufficient to enable the lever 16 to be actuated with sufficient force for the purposes of this device, by moving the extension 18.

As clearly shown in Fig. 6, the lever 16 is provided with an opening with a relatively narrow portion. This opening 19 is arcuate save that it has a straight wall 20 adjacent the narrow part thereof.

A blade spring 21 is connected to the inner lateral face of the bearing 5, and this urges the lever 16 in the direction of the arrow *d* shown in Fig. 6 so that the portion 20 is forced in front of the enlargement 13, and thus acts as a latch.

The operation of my device is as follows:—

When the turn table 3 is revolved and the record thereon is being played, the parts are in the position shown in Fig. 5. When the playing of the record has been completed, the tone arm 22 which is diagrammatically shown in dotted lines in Fig. 6, contacts with the extension 18 and revolves this extension 18 as well as the lever 16 in the direction of the arrow e shown in Fig. 6. This causes the release of the enlargement 13, so that the compression spring 12 is free to force the friction member 14 into the position shown in Fig. 1, whereby the turn table is braked and the revolution thereof is stopped.

Since the brake member 14 is forced longitudinally against the lateral surface of the turn table, the gradual wear which is produced by the operation of the device does not affect the smoothness and certainty of the braking effect. This smooth reliable action is assisted by the shape of the brake member 14. It is to be noted that all parts of the brake member 14 are forced against a portion of the turn table which moves with the same velocity so that the wear of the member 14 must be uniform. Of course as the tip of the member 14 is worn down by use, this tip becomes somewhat concave so as to correspond to the curvature of the lateral face of the turn table 3.

By manipulating the adjusting lever 6, the brake bolt 11 can be moved back into the inoperative position shown in Fig. 5.

I have described a preferred embodiment of my invention, but it is clear that numerous changes and omissions could be made without departing from its spirit.

I claim:—

In combination with the turn table of a phonograph having a lateral surface, a bearing having a recess substantially perpendicular to the said lateral surface, a brake bolt located in the said recess and having both of its ends projecting out of the said recess, the end of said brake bolt adjacent the said turn table having an enlargement, a compression spring located within the said recess and having one of the ends thereof abutting the said enlargement, a brake member connected to the said brake bolt adjacent the said enlargement and adapted to exercise a braking effect on the said lateral surface, a latch lever pivotally mounted to the said bearing adjacent the said turn table and having an opening through which the said enlargement projects, the said latch lever being adapted to engage the said enlargement at one of the edges of the said opening, a second bearing substantially perpendicular to the recess of the first mentioned bearing and located on that side of the first mentioned bearing which is opposite to the said turn table and an adjusting lever pivotally mounted on the second bearing and adapted to engage the adjacent projecting end of the said brake bolt.

In testimony whereof I hereunto affix my signature.

WILLY RIES.